(12) United States Patent
RÖßner et al.

(10) Patent No.: US 11,752,855 B2
(45) Date of Patent: Sep. 12, 2023

(54) BEARING UNIT FOR A HYBRID MODULE

(71) Applicant: ZF FRIEDRICHSHAFEN AG, Friedrichshafen (DE)

(72) Inventors: Monika RÖßner, Donnersdorf (DE); Gerald Viernekes, Hassfurt (DE); Wolfgang Kundermann, Dornburg-Dorndorf (DE); Wolfgang Großpietsch, Schweinfurt (DE); Martin Brehmer, Tettnang (DE); Thilo Schmidt, Meckenbeuren (DE); Thomas Riedisser, Sigmarszell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 589 days.

(21) Appl. No.: 17/046,415

(22) PCT Filed: Apr. 4, 2019

(86) PCT No.: PCT/EP2019/058447
§ 371 (c)(1),
(2) Date: Oct. 9, 2020

(87) PCT Pub. No.: WO2019/197250
PCT Pub. Date: Oct. 17, 2019

(65) Prior Publication Data
US 2021/0107346 A1  Apr. 15, 2021

(30) Foreign Application Priority Data

Apr. 11, 2018 (DE) .................... 10 2018 205 471.1

(51) Int. Cl.
*B60K 6/387* (2007.10)
*B60K 6/26* (2007.10)
(Continued)

(52) U.S. Cl.
CPC ............. *B60K 6/387* (2013.01); *B60K 6/26* (2013.01); *B60K 6/40* (2013.01); *H02K 7/006* (2013.01)

(58) Field of Classification Search
CPC . B60K 6/387; B60K 6/26; B60K 6/40; H02K 7/006
See application file for complete search history.

(56) References Cited

U.S. PATENT DOCUMENTS

| | | | |
|---|---|---|---|
| 8,997,956 B2* | 4/2015 | Iwase | F16H 45/02 192/3.3 |
| 2008/0023287 A1* | 1/2008 | Thiede | B60L 50/16 192/48.1 |
| 2011/0240431 A1 | 10/2011 | Iwase et al. | |

FOREIGN PATENT DOCUMENTS

| | | |
|---|---|---|
| DE | 102009019585 | 11/2009 |
| EP | 1736345 | 12/2006 |
| JP | 2006298272 | 11/2006 |

OTHER PUBLICATIONS

Office Action of the corresponding German Patent Application No. 10 2018 205 471.1.

* cited by examiner

*Primary Examiner* — John D Walters
(74) *Attorney, Agent, or Firm* — Cozen O'Connor

(57) ABSTRACT

A hybrid module having a damper hub connected to an internal combustion engine, a housing, a clutch, an electric machine which has a rotor and a stator connected to the housing, a torque converter has a converter housing connected to a central hub and a turbine shaft, and an output shaft. The rotor of the electric machine is connected to the central hub or the converter housing. The turbine shaft is connected to the output shaft to be fixed with respect to rotation and the clutch is arranged between the damper hub (Continued)

and the torque converter The central hub is supported at the output shaft via at least one bearing and is supported at the damper hub via at least two bearings and the damper hub is supported at the housing by a bearing.

11 Claims, 3 Drawing Sheets

(51) Int. Cl.
*B60K 6/40* (2007.10)
*H02K 7/00* (2006.01)

BEARING UNIT FOR A HYBRID MODULE

CROSS REFERENCE TO RELATED APPLICATIONS

This is a U.S. national stage of Application No. PCT/EP2019/058447 filed Apr. 4, 2019. Priority is claimed on German Application No. DE 10 2018 205 471.1 filed Apr. 11, 2018 the content of which is incorporated herein by reference.

BACKGROUND OF THE INVENTION

1. Field of the Invention

The invention is directed to the bearing arrangement in a hybrid drive module for a motor vehicle. The hybrid module is arranged between an internal combustion engine and a transmission and has an electric machine.

2. Description of Related Art

Various designs of hybrid modules are known from the prior art. The moving parts such as the damper hub or rotor support are supported at the stationary housing. Different variants for mounting the component parts at the housing are known, for example, from EP 1 736 345 A1.

SUMMARY OF THE INVENTION

A disadvantage of the prior art consists in the required installation space, the complicated manufacture of the housing, and the assembly costs.

Therefore, it is an object of one aspect of the invention to provide a hybrid module that requires less installation space, particularly in axial direction, and which is simple to produce and to assemble.

According to one aspect of the invention, a hybrid module comprises a damper hub connected to an internal combustion engine, a housing, a clutch, an electric machine that has a rotor and a stator connected to the housing, a torque converter that has a converter housing connected to a central hub and a turbine shaft, and an output shaft, wherein the rotor of the electric machine is connected to the central hub or to the converter housing, wherein the turbine shaft is connected to the output shaft so as to be fixed with respect to rotation relative to it, and wherein the clutch is arranged between the damper hub and the torque converter. One aspect of the invention is characterized in that the central hub is supported at the output shaft via at least one bearing and is supported at the damper hub via at least two bearings, and in that the damper hub is supported at the housing by at least one bearing.

In a hybrid module, two different drive sources are used for an application. These different drive sources can be operated alternately or cumulatively. An internal combustion engine and an electric machine are a common combination. The hybrid module conveys the power flow or power flows to the downstream consumers, for example, a drivetrain of a vehicle. To enable a transmission of power from the internal engine, the hybrid module has a damper hub connected to the internal combustion engine. By the damper hub, a rotational movement can be conveyed to a clutch. The purpose of the clutch is to decouple the internal combustion engine from the drivetrain when the internal combustion engine is turned off in order to prevent losses.

The clutch is arranged in a housing, as is an electric machine. The stator of the electric machine is connected to the housing. The rotor of the electric machine is arranged as further drive source in the power flow after the clutch and is connected to the input side of a torque converter. The connection to the torque converter is effected via the converter housing, and the rotor can be connected either directly to the latter or to a central hub connected thereto. Embodiment forms in which the rotor is connected to the central hub or to the converter housing via a rotor support are also included.

The output side of the torque converter is formed by a turbine shaft connected to the output shaft so as to be fixed with respect to rotation relative to it. The hybrid module is connected to the further drivetrain, such as a transmission, particularly an automatic transmission, via the output shaft.

The damper hub and the central hub are formed as hollow shafts that extend coaxially and are inserted at least in portions one over the other so that they overlap in axial direction. The bearing arrangement is generated by at least one bearing by which the central hub is supported at an inner diameter at the central output shaft or by which the output shaft is supported. At least two bearings by which the central hub and the damper hub are supported relative to one another are provided at the outer circumferential surfaces of the central hub. Further, the damper hub is supported at an outer diameter by at least one bearing at the housing. Accordingly, the damper hub and central hub are mounted relative to one another and are jointly supported at the housing and output shaft, respectively. By a construction of this kind, the supporting width of the bearing arrangement can be increased and/or the required installation space in axial direction can be reduced. Further, wear of the bearings can be reduced because, depending on the constructional type of hybrid module, there is no relative movement between individual component parts, since they have an identical rotational speed. The nested arrangement of the bearings also facilitates a sequential assembly or a preassembly of component groups so that the assembly process can be simplified.

Embodiment forms of hybrid modules according to aspects of the invention are characterized in that the converter housing is supported at the housing or output shaft via a further bearing. The converter housing is connected to the central hub and can be supported via the latter. However, because of the size of the converter housing and the axial extension thereof, a further bearing is advantageously preferably provided at the axial end of the converter housing remote of the central hub. This bearing is preferably supported at the housing. Alternatively, a support at the output shaft, or both, would also be possible.

Embodiment forms of hybrid modules according to aspects of the invention are characterized in that the bearings are formed as rolling element bearings. Ball bearings, roller bearings or needle bearings which are relatively inexpensive and which enable a reliable, low-friction bearing arrangement are contemplated in particular for this purpose.

Inventive embodiment forms of a hybrid module are characterized in that the bearing between the housing and damper hub, a bearing between the damper hub and central hub, and the bearing between the central hub and output shaft are formed, respectively, in radial direction at least for one bearing arrangement, and in that at least two of these bearings are arranged so as to at least partially overlap. The bearings absorb at least radial forces between the nested component parts. In order to improve the flow of bearing forces through the component parts and, therefore, to minimize an additional loading of individual component parts such as the damper hub by the bearing forces of component parts supported thereon such as the central hub, at least two bearings are arranged so as to at least partially overlap one another. In other words, at least a portion of the axial extension of the bearings is situated in one and the same radial plane. A further advantage consists in the possible reduction of required axial installation space.

Preferred embodiment forms of hybrid modules according to aspects of the invention are characterized in that all three of the bearings are arranged so as to at least partially overlap. A further improvement in the flow of bearing forces and possibly in the required installation space can be achieved when all three of the bearings overlap one another, i.e., the bearing between housing and damper hub, a bearing between damper hub and central hub, and the bearing between central hub and output shaft.

Further preferred embodiment forms of hybrid modules according to aspects of the invention are characterized in that the overlapping bearings completely cover one another. It is advantageous when the overlapping is as extensive as possible. Therefore, a complete coverage in which the bearing with reduced or identical axial extension is arranged entirely between radial planes defined by axial ends of a wider bearing so that the flow of bearing forces through the component parts is improved.

Embodiment forms of hybrid modules according to aspects of the invention are characterized in that the bearing between housing and damper hub is formed to support in both radial direction and axial direction. In order to absorb axial forces and transmit these axial forces to the housing, the bearing between the damper hub and housing is formed in a corresponding manner, preferably as a corresponding rolling element bearing such as a groove ball bearing, angular contact ball bearing, four-point contact bearing, conical rolling bearing, crossed roller bearing and the like.

Embodiment forms of hybrid modules according to aspects of the invention are characterized in that a bearing between the damper hub and central hub is formed to support in both radial direction and axial direction. In order to absorb occurring axial forces, at least one of the bearings between damper hub and central hub is correspondingly formed, preferably as rolling element bearing.

Alternative embodiment forms of hybrid modules according to aspects of the invention are characterized in that a thrust bearing is arranged between the damper hub and central hub. Instead of a bearing that can absorb radial forces as well as axial forces, at least one thrust bearing can also be provided by which axial bearing forces can be absorbed.

Embodiment forms of hybrid modules according to aspects of the invention are characterized in that the damper hub is connected to the internal combustion engine via a vibration damper, in that a bearing between damper hub and central hub is formed to support in radial direction, and in that the bearing is arranged to at least partially overlap the vibration damper. In order to reduce unwanted torsional vibrations in the drivetrain which occur particularly as a result of internal combustion engines constructed as piston engines, a known vibration damper is preferably provided between the internal combustion engine and the damper hub. This vibration damper is connected, preferably via an external toothing at the damper hub, to the damper hub so as to be fixed with respect to rotation relative to it. Therefore, to absorb occurring forces as completely as possible and to minimize loading of component parts, a bearing supporting the damper hub at the central hub is arranged to overlap with the vibration damper. In other words, at least a portion of the axial extension of the bearing and of the axial extension of the vibration damper, particularly of the connection between the damper hub and the vibration damper, are situated in one and the same radial plane. The bearing is preferably completely covered.

A further aspect of the invention is a powertrain for a vehicle characterized by a hybrid module according to the preceding embodiment forms.

The embodiment forms are not limited to the examples above and may be achieved through other appropriate embodiments. The features of the embodiment forms may be combined in any manner.

BRIEF DESCRIPTION OF THE DRAWINGS

The invention will be described in more detail in the following referring to figures. Like reference numerals designate like or similar components. The drawings show particularly.

DETAILED DESCRIPTION OF THE PRESENTLY PREFERRED EMBODIMENTS

Figure 1:
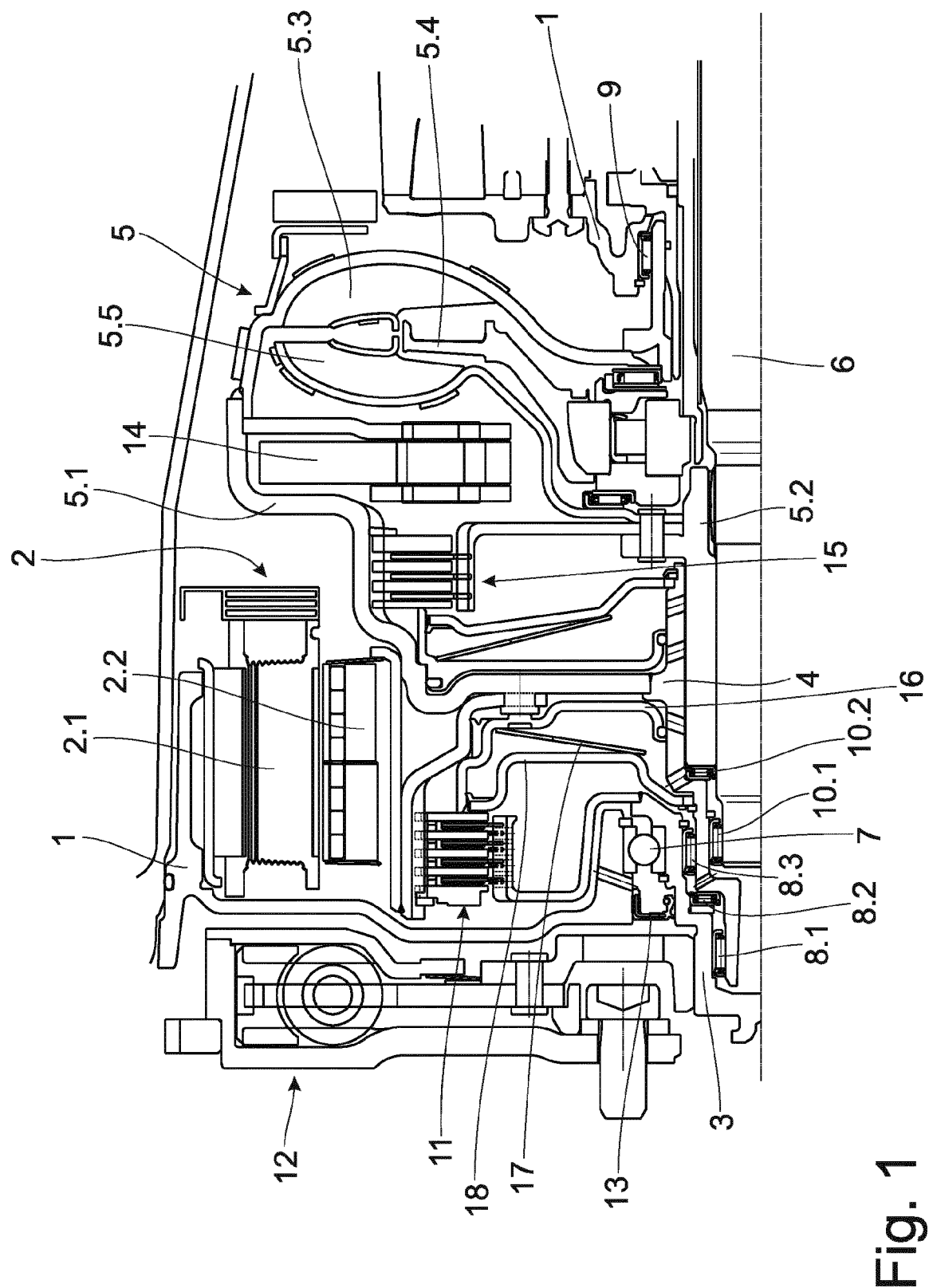
FIG. 1 is a schematic section through a hybrid module.

FIG. 1 shows a hybrid module according to one aspect of an embodiment example in a schematic sectional diagram, one half of which has been omitted in view of symmetry. The hybrid module comprises a housing 1 within which is arranged an electric machine 2 with a stator 2.1 which is fixed with respect to rotation relative to the housing 1 and a rotatable rotor 2.2. The rotor 2.2 of the electric machine 2 is fixedly connected to the converter housing 5.1 and to a rotor support which is likewise connected to the converter housing 5.1.

A clutch 11 by which the internal combustion engine can be disconnected from the further drivetrain is also provided inside the housing 1. To this end, the clutch 11 is arranged between the damper hub 3 and the central hub 4 or, more precisely, the clutch parts are correspondingly connected to the damper hub 3 and the central hub 4, respectively. The clutch 11 is operated by an actuation piston 16 so that power can be transmitted via the clutch 11. At least one resetting element 17, which resets the actuation piston 16 opposite the actuating direction, is provided in order to reliably change from an actuated state to a disconnect state again. The resetting element 17 is supported at an orifice plate 18 and is formed in the depicted embodiment example as a diaphragm spring or plate spring, although other constructions are also possible.

The hybrid module has a torque converter 5. An impeller wheel 5.3 of the torque converter 5 is fixedly connected to a converter housing 5.1 of the torque converter 5. A stator wheel 5.4 of the torque converter 5 is supported so as to be fixed with respect to relative rotation in one rotational direction via a freewheel. A turbine wheel 5.5 of the torque converter 5 is connected to a turbine shaft 5.2 of the torque converter 5. The hybrid module further has an additional, optional torsional vibration damper 14 s arranged inside and at the converter housing 5.1. The turbine shaft 5.2 is connected to an output shaft 6 of an automatic transmission, not shown in more detail. Further, a lockup clutch 15 is arranged inside of the converter housing 5.1. The converter housing 5.1 is directly connectable to the turbine shaft 5.2 by engaging the lockup clutch 15. The construction for actuation of the lockup clutch 15 is analogous to the actuation of clutch 11, although different embodiments are also possible.

The central hub 4 is formed as a hollow shaft arranged coaxial to the output shaft 6 and so as to envelop the latter. A bearing 10.1 which can absorb bearing forces at least in radial direction is provided between the output shaft 6 and the central hub 4. In the example shown in FIG. 1, a thrust bearing 10.2 is additionally provided between the central hub 4 and the turbine shaft 5.2 which is connected to the output shaft 6 so as to be fixed with respect to rotation relative to it. The central hub 4 is connected on its outer side to the converter housing 5.1 and to one side of the clutch 11. A plurality of bearings 8.1; 8.2; 8.3 are provided between the central hub 4 and the damper hub 3 for further support of the central hub 4 and damper hub 3. At least two of the bearings 8.1; 8.3 can absorb bearing forces in radial direction. In the depicted embodiment example, an additional thrust bearing 8.2 is also provided between damper hub 3 and central hub 4 to absorb axial bearing forces. A further bearing 9 is provided between converter housing 5.1 and housing 1 at the axial end of the torque converter 5 remote of the damper hub 3 in order to support the torque converter 5 on a base that is as broad as possible and, therefore, in order to minimize the occurring bearing forces. Alternately or cumulatively, the further bearing of the converter housing 5.1 could be arranged between converter housing 5.1 and output shaft 6. In this case, the further bearing arrangement (not shown) of the output shaft 6 must also be taken into account particularly as regards a possibly overdetermined bearing arrangement.

All of the previously mentioned bearings 8.1; 8.2; 8.3; 9; 10.1; 10.2 of the hybrid module of the embodiment shown in FIG. 1 are formed as roller bearings or needle bearings, although other constructional types of bearings are possible in which both radial and axial forces can be absorbed as the case may be. A bearing 7 is likewise provided between the damper hub 3 and the housing 1. In this example, bearing 7 is formed as a groove ball bearing and can therefore absorb radial bearing forces as well as axial bearing forces. Various other constructional types of rolling element bearings are also possible in this case.

For an optimized flow of force through the component parts, the bearings 7; 8.3; 10.1 are arranged in FIG. 1 so as to at least partially radially overlap with respect to their position along the rotational axis of the hybrid module. The bearing 7 between housing 1 and damper hub 3 overlaps substantially completely with the bearing 8.3 between the damper hub 3 and central hub 4. Bearing 10.1 largely overlaps the two other bearings 7; 8.3. With a corresponding arrangement of the structural component parts, all three of the bearings 7; 8.3; 10.1 can also completely overlap, which can be advantageous with respect to power flow and installation space. However, arrangements in which the bearings 7; 8.3; 10.1 overlap not at all or only partially may also be advantageous with regard to installation space.

The housing 1 separates a wet space of the hybrid module from a dry space. The wet space is sealed relative to the dry space by a seal 13, which is arranged, preferably directly, adjacent to the bearing 7.

A vibration damper 12, which is connected to an internal combustion engine, not shown, is provided on the damper hub 3. Possible torsional vibrations are reduced by the vibration damper 12 in order to supply the hybrid module with a torque or rotational movement that is as uniform as possible. At the same time, positional tolerances and alignment tolerances between the internal combustion engine and the hybrid module can be compensated by the vibration damper. In this example, a bearing 8.1 between the damper hub 3 and the central hub 4 has a position that is shifted in direction of the internal combustion engine to such an extent that bearing 8.1 virtually completely overlaps the vibration damper 12 in radial direction in this instance.

Figure 2:
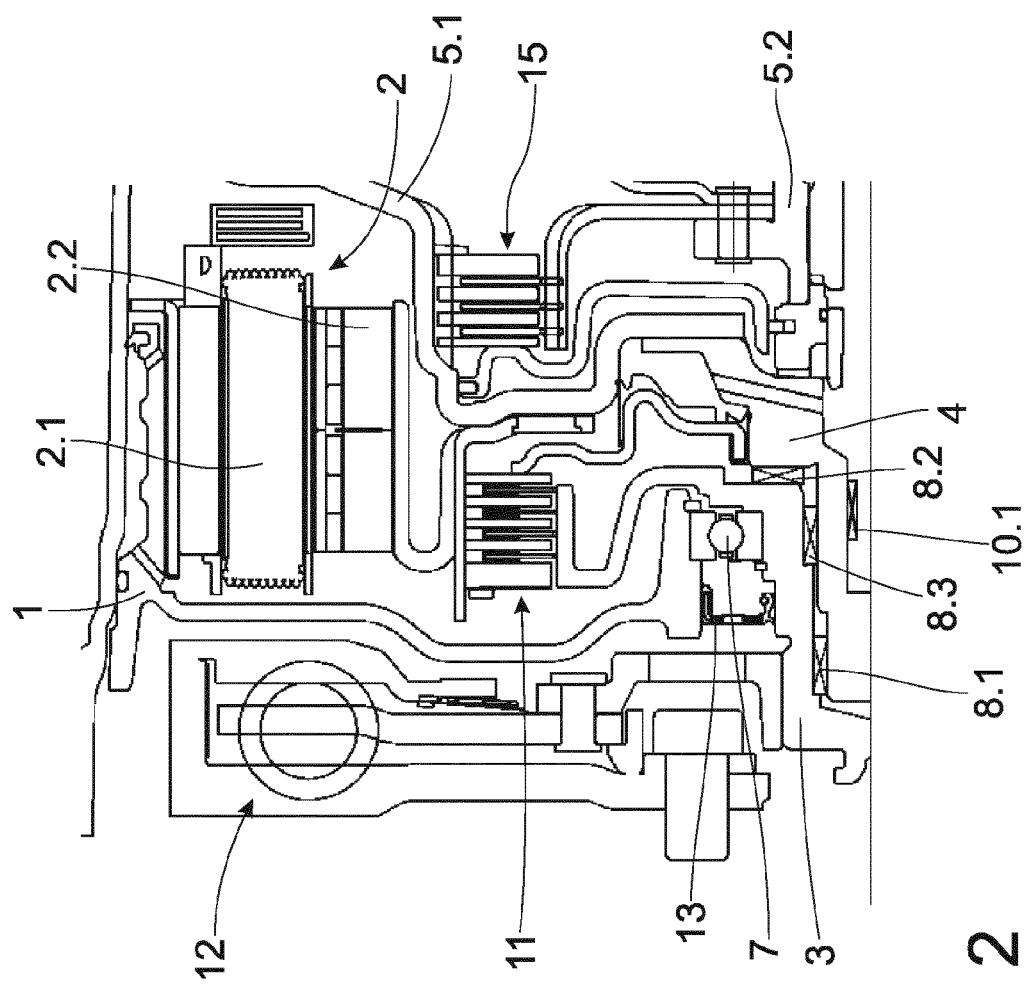
FIG. 2 is a schematic section through a subarea of a hybrid module.

FIG. 2 is a partial area of a hybrid module according to one aspect of the invention. However, FIG. 2 shows only the region around the electric machine 2, and the output shaft 6 is omitted from the drawing. The basic construction agrees with FIG. 1 and reference is made to the preceding description.

One difference consists in the arrangement of the bearings 8.1; 8.2; 8.3 between the damper hub 3 and the central hub 4 in which the thrust bearing 8.2 is relocated farther into the housing 1 to a position with more radial installation space. The bearings 8.1; 8.2; 8.3 are represented in this case merely by stylized placeholders for various constructional forms. Further, only one bearing 10.1 is provided between the central hub 4 and the output shaft 6 which is not shown in FIG. 2. As in FIG. 1, a separate thrust bearing 10.2 has been dispensed with so that the number of parts can be reduced and correspondingly more installation space is available or less installation space is required.

Figure 3:
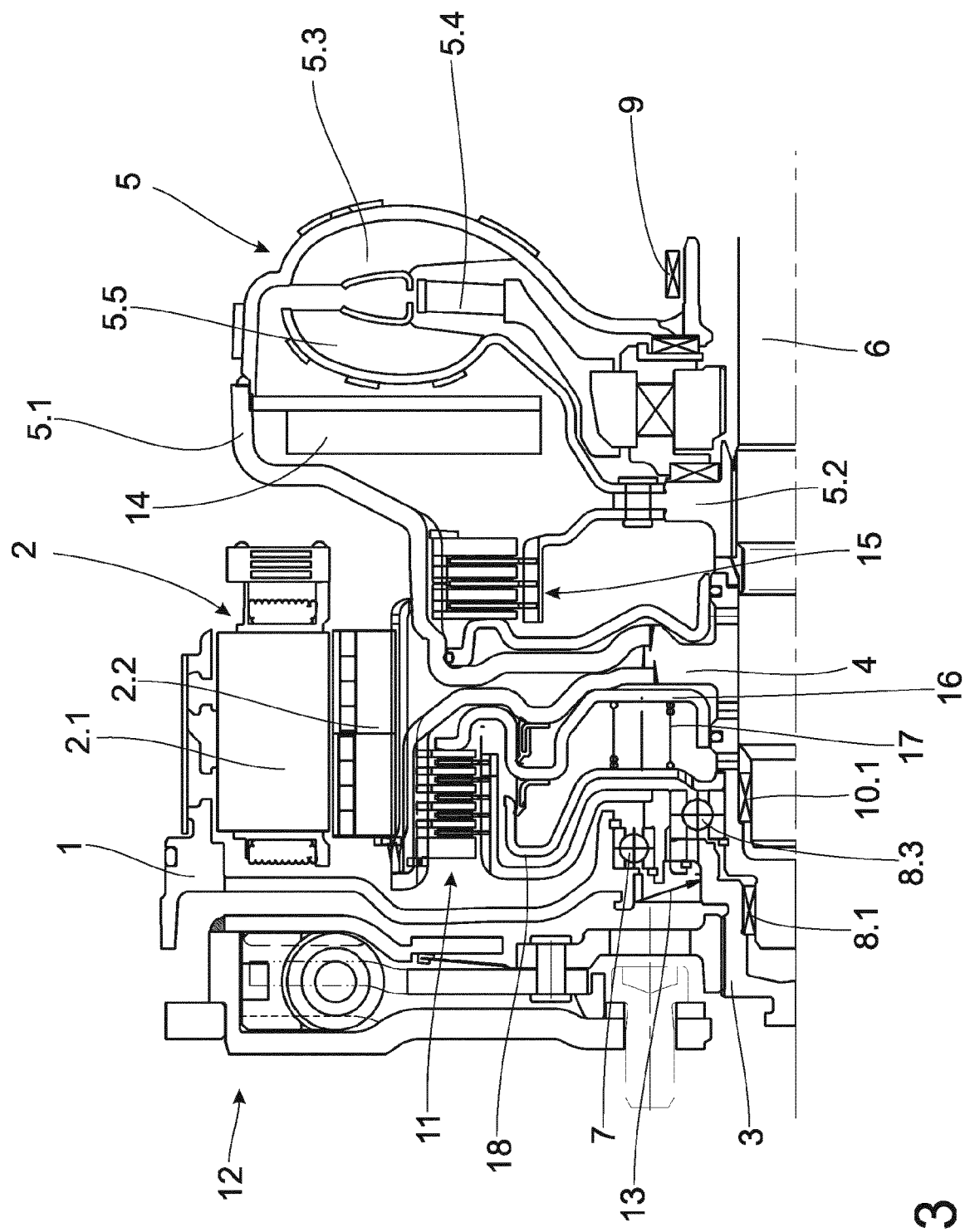
FIG. 3 is a schematic section through a hybrid module.

FIG. 3 also shows a hybrid module according to one aspect of the invention analogous to FIG. 1. The basic construction is also identical in this instance so that reference is again made to the above description. In contrast, the resetting element 17 for the actuation piston 16 of the clutch 11 is formed by helical springs. Further, the lockup clutch 15 has been formed without the setting element because, in this case, purely through the existing pressure in the torque converter 5, the requirement is reduced and axial installation space can accordingly be saved. In this embodiment example, the bearing 7 between the housing 1 and the damper hub 3 is likewise formed as a ball bearing.

In contrast to the examples in FIG. 1 and FIG. 2, only two bearings 8.1; 8.3 are provided between the damper hub 3 and central hub 4. Instead of a separate thrust bearing 8.2, one of the bearings 8.3 in this embodiment example is also constructed as a ball bearing so that both radial and axial bearing forces can be absorbed. Compared to the embodiment examples, the two bearings 8.1; 8.3 are also arranged at a greater axial distance from the internal combustion engine. Accordingly, the one bearing 8.3 only slightly overlaps the bearing 7 between the damper hub 3 and the housing 1, and the further bearing 8.1 only slightly overlaps the vibration damper 12.

The bearing 10.1 between the central hub 4 and the output shaft 6 is likewise arranged at a greater axial distance from the internal combustion engine so that, while it still partially overlaps with the bearing 8.3 between central hub 4 and damper hub 3, it no longer overlaps with the bearing 7 between damper hub 3 and housing 1. As in the example shown in FIG. 2, there is also only one bearing 10.1 provided between central hub 4 and output shaft 6.

The invention is not limited to the embodiments described herein. As mentioned above, only particular advantageous features may also be provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hybrid module comprising:
   a damper hub configured to be connected to an internal combustion engine;
   a housing;
   a central hub;
   an output shaft,
   an electric machine comprising:
      a rotor; and
      a stator connected to the housing;
   a torque converter comprising:
      a converter housing connected to the central hub; and
      a turbine shaft connected to the output shaft so as to be fixed with respect to rotation relative to the output shaft;
   wherein the rotor of the electric machine is connected to the central hub or to the converter housing;
   a clutch arranged between the damper hub and the torque converter;
   at least one first bearing configured to support the central hub at the output shaft;
   at least two second bearings configured to support the central hub at the damper hub; and
   at least one third bearing configured to support the damper hub at the housing.

2. The hybrid module according to claim 1, wherein the converter housing is supported at the housing or output shaft via a fourth bearing.

3. The hybrid module according to claim 2, wherein the at least one first bearing, the at least two second bearings, the at least one third bearing, and the fourth bearing are rolling element bearings.

4. The hybrid module according to claim 1, wherein the third bearing between housing and damper hub, at least one second bearing between damper hub and central hub, and the at least one first bearing between central hub and output shaft are formed, respectively, in radial direction at least for one bearing arrangement, and
   wherein at least two of these bearings are arranged to at least partially overlap.

5. The hybrid module according to claim 4, wherein all three of the bearings are arranged so as to at least partially overlap.

6. The hybrid module according to claim 4, wherein the overlapping bearings completely cover one another.

7. The hybrid module according to claim 1, wherein the at least one third bearing between housing and damper hub is formed to support in both a radial direction and an axial direction.

8. The hybrid module according to claim 1, wherein one of the at least two second bearings between damper hub and central hub is formed to support in both a radial direction and an axial direction.

9. The hybrid module according to claim 1, further comprising:
   a thrust bearing arranged between the damper hub and the central hub.

10. The hybrid module according to claim 1, further comprising:
    a vibration damper configured to connect the damper hub to the internal combustion engine;
    wherein at least one of one of the at least two second bearings between the damper hub and the central hub is formed to support in a radial direction, and
    wherein at least one of one of the at least two second bearings is arranged to at least partially overlap the vibration damper.

11. A powertrain for a vehicle comprising:
    a hybrid module comprising:
       a damper hub configured to be connected to an internal combustion engine;
       a housing;
       a central hub;
       an output shaft,
       an electric machine comprising:
          a rotor; and
          a stator connected to the housing;
       a torque converter comprising:
          a converter housing connected to the central hub; and
          a turbine shaft connected to the output shaft so as to be fixed with respect to rotation relative to the output shaft;
       wherein the rotor of the electric machine is connected to the central hub or to the converter housing;
       a clutch arranged between the damper hub and the torque converter;
       at least one first bearing configured to support the central hub at the output shaft;
       at least two second bearings configured to support the central hub at the damper hub; and
       at least one third bearing configured to support the damper hub at the housing.

* * * * *